United States Patent
You

(10) Patent No.: US 9,493,651 B2
(45) Date of Patent: Nov. 15, 2016

(54) HALOGEN-FREE RESIN COMPOSITION, AND PREPREG AND LAMINATE FOR PRINTED CIRCUITS USING THE SAME

(71) Applicant: SHENGYI TECHNOLOGY CO., LTD., Guangdong (CN)

(72) Inventor: Jiang You, Guangdong (CN)

(73) Assignee: SHENGYI TECHNOLOGY CO., LTD., Guangdong (CN)

( * ) Notice: Subject to any disclaimer, the term of this patent is extended or adjusted under 35 U.S.C. 154(b) by 22 days.

(21) Appl. No.: 14/563,398

(22) Filed: Dec. 8, 2014

(65) Prior Publication Data

US 2016/0024304 A1    Jan. 28, 2016

(30) Foreign Application Priority Data

Jul. 22, 2014  (CN) .......................... 2014 1 0351583

(51) Int. Cl.
  C08L 63/00   (2006.01)
  C08L 61/06   (2006.01)
  C08L 79/04   (2006.01)
  C08L 63/04   (2006.01)

(52) U.S. Cl.
  CPC ............... C08L 79/04 (2013.01); C08L 63/00 (2013.01); C08L 63/04 (2013.01); C08L 2201/02 (2013.01); C08L 2203/20 (2013.01)

(58) Field of Classification Search
  CPC ........ C08L 63/04; C08L 79/04; C08L 63/00; C08L 2201/02; C08L 2203/20
  USPC ......... 523/451, 400, 466; 525/486, 523, 534
  See application file for complete search history.

(56) References Cited

U.S. PATENT DOCUMENTS

| | | | |
|---|---|---|---|
| 2007/0221890 A1* | 9/2007 | Gan | C07F 9/657172 252/601 |
| 2010/0032826 A1* | 2/2010 | Tachibana | C08L 63/00 257/692 |
| 2013/0161080 A1 | 6/2013 | Lin | |
| 2015/0307703 A1* | 10/2015 | He | C08G 59/50 428/195.1 |

FOREIGN PATENT DOCUMENTS

| | | | | |
|---|---|---|---|---|
| CN | 101831139 | | 9/2010 | |
| CN | 102633991 | | 8/2012 | |
| CN | 103013046 A | * | 4/2013 | .............. C08L 63/00 |
| CN | 103421273 | | 12/2013 | |
| CN | 103834168 | | 6/2014 | |
| JP | 08048749 A | * | 2/1996 | .............. C08G 59/24 |
| JP | 09269168 | | 10/1996 | |
| JP | 2003128749 A | * | 5/2003 | .............. C08G 59/24 |
| KR | 1020140067005 | | 6/2014 | |
| TW | 201319154 | | 5/2013 | |
| WO | WO2011142466 | | 11/2011 | |
| WO | WO2013134752 | | 9/2013 | |
| WO | WO2014104742 | | 7/2014 | |

OTHER PUBLICATIONS

Shintani et al., JP 2003-128749 A machine translation in English, May 8, 2003.*
Akatsuka et al., JP 08-048749 A machine translation in English, Feb. 20, 1996.*
International Search Report cited in PCT Application No. PCT/CN2014/087281 dated Apr. 21, 2015.
European Search Report cited in European Application No. 14198666.1-1301 dated Jul. 31, 2015.

* cited by examiner

*Primary Examiner* — David Karst
(74) *Attorney, Agent, or Firm* — Workman Nydegger

(57) ABSTRACT

Halogen-free resin composition, prepreg, and laminate for printed circuits using same. Based on 100 parts by weight of organic solid matter, the resin composition comprises: (A) bisphenol-type epoxy resin: 30~60 parts by weight; (B) benzoxazine resin: 5~45 parts by weight; (C) alkyl phenol novolac hardener: 10~30 parts by weight; (D) phosphorus-containing flame retardant. The bisphenol-type epoxy resin, with numerous alkyl branched chains and benzene rings in its structure, makes the composition possess high glass transition temperature, low water absorption, good thermal resistance, and excellent dielectric properties. Taking the alkyl phenol novolac as the hardener can sufficiently exert the advantages of excellent dielectric properties and low water absorption resulted from containing numerous alkyls. The prepreg and laminate for printed circuits made from halogen-free resin composition have high glass transition temperature, low dielectric constant, low dielectric dissipation factor, low water absorption, high thermal resistance, and good flame retardancy, processability and chemical resistance.

15 Claims, No Drawings

HALOGEN-FREE RESIN COMPOSITION, AND PREPREG AND LAMINATE FOR PRINTED CIRCUITS USING THE SAME

TECHNICAL FIELD

The present invention relates to a halogen-free low dielectric resin composition, and prepreg and laminate for printed circuits using same, which have the advantages of high glass transition temperature, low dielectric constant, low dielectric dissipation factor, low water absorption, high thermal resistance and good flame retardancy, processability and chemical resistance.

BACKGROUND ART

Traditional laminates for printed circuits usually employ brominated flame retardants to achieve flame retardancy, and especially employ tetrabromobisphenol-A epoxy resin. Such brominated epoxy resin has good flame retardancy but generates hydrogen bromide gas when combusting. In addition, dioxin, dibenzofuran and other cancerogenic substances have been detected in combustion products of halogen (such as bromide and chloride, etc.)-containing electrical and electronic equipment wastes for the past few years, therefore the application of brominated epoxy resins is under restrictions. Two European Union environment-protecting directives of "waste electrical and electronic equipment" and "the restriction of the use of certain hazardous substances in electrical and electronic equipment" have been officially implemented on Jul. 1, 2006, and the development of halogen-free flame retardant copper-clad laminates has become a hot spot in the industry. Each copper-clad laminates manufacturer has sequentially introduced its own halogen-free flame retardant copper-clad laminates.

Meanwhile, along with high speed and multi-functionalization in information processing of electronic products, application frequency has been constantly increased. Besides maintaining increasingly high requirements for environment protection, dielectric constant and dielectric dissipation value are requested to be increasingly low. Accordingly, reducing Dk/Df has been a hot spot pursued by baseboard practitioners.

CN 101418205 discloses a halogen-free flame retardant adhesive and its application in prepreg and multilayer printed board. The adhesive consists of resin, organic phosphorus-containing flame retardant, inorganic filler, curing accelerator and solvent, wherein the resin is a composition consisting of 40-60 parts of benzoxazine resin, 15-20 parts of linear novolac resin, 20-45 parts of epoxy prepolymer, based on the parts by mass. The patent also discloses that the epoxy prepolymer is bisphenol-A epoxy resin, bisphenol-F epoxy resin, bisphenol-S epoxy resin or novolac epoxy resin, using linear novolac resin as a hardener. The adhesive possesses high glass transition temperature, high thermal resistance, high adhesion and low water absorption. However, along with high speed and multi-functionalization in consumer electronic information processing, the requirements of baseboard on glass transition temperature, thermal resistance, dielectric properties are becoming higher. The bisphenol-A epoxy resin, bisphenol-F epoxy resin, bisphenol-S epoxy resin have low glass transition temperature as well as poor thermal resistance and dielectric properties, and the novolac epoxy resin has high glass transition temperature and high thermal resistance but poor dielectric properties. Neither of them could meet the requirements on dielectric properties for high-speed areas laminates.

SUMMARY OF THE DISCLOSURE

Based on the foregoing, the purpose of the present invention lies in providing a halogen-free low dielectric resin composition, and prepreg and laminate for printed circuits using same. The laminate for printed circuits made by using the resin composition has the advantages of high glass transition temperature, low dielectric constant, low dielectric dissipation factor, low water absorption, high thermal resistance and good flame retardancy, processability and chemical resistance.

The present inventors have conducted repeated and thorough study to achieve the aforementioned purpose. As a consequence, it is found that the composition prepared by properly mixing bisphenol-type epoxy resin, benzoxazine resin, alkyl phenol novolac hardener, phosphorus-containing flame retardant and other optional substances, can achieve the aforementioned purpose.

The present invention employs the following technical solution:

a halogen-free resin composition, comprising the following four substances as essential components, based on 100 parts by weight of the organic solid matter, comprising the followings:

(A) bisphenol-type epoxy resin: 30~60 parts by weight;

the bisphenol-type epoxy resin is any one selected from the epoxy resin of formula (a), formula (b) or formula (c), or a mixture of at least two:

formula (a)

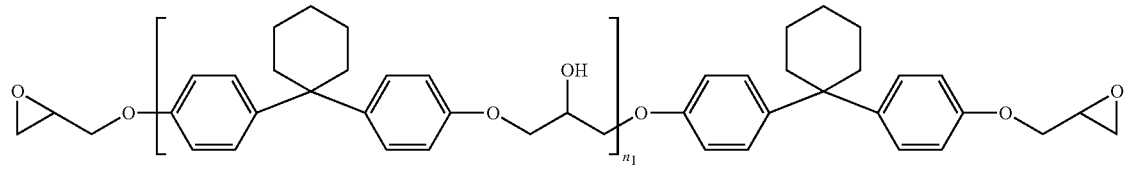

formula (b)

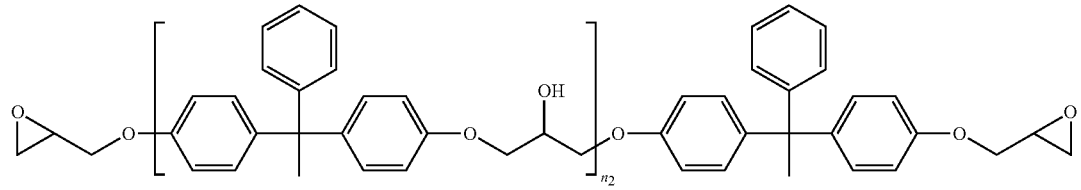

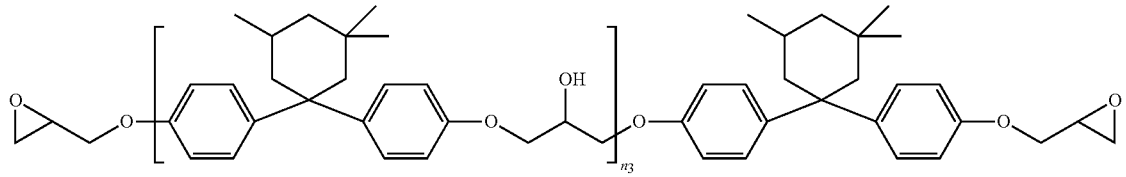

wherein, $n_1, n_2$ and $n_3$ are each independently any integer between 2-20, e.g. 3, 4, 5, 6, 7, 8, 9, 10, 11, 12, 13, 14, 15, 16, 17, 18 or 19;

(B) benzoxazine resin: 5~45 parts by weight;
(C) alkyl phenol novolac hardener: 10~30 parts by weight;
(D) phosphorus-containing flame retardant.

The present invention employs the bisphenol-type epoxy resin containing lots of branched alkyl groups and benzene rings in its molecular structure, making the composition have high glass transition temperature, low water absorption, good flame retardancy as well as excellent dielectric properties; being mixed with the benzoxazine resin can improve the thermal retardancy of the cured product and further reduce the water absorption; taking alkyl phenol novolac as the hardener can sufficiently exert the advantages of excellent dielectric properties and low water absorption resulted from the lots of alkyls-containing structure. The perpreg and laminate for printed circuits made by using the halogen-free thermosetting resin composition, have the advantages of high glass transition temperature, low dielectric constant, low dielectric dissipation factor, low water absorption, high thermal resistance and good flame retardancy, processability and chemical resistance.

DETAILED DESCRIPTION

The detailed descriptions of embodiments of the components are as follows:

The component (A) in the present invention, i.e., the bisphenol-type epoxy resin, can provide the glass transition temperature, electrical properties, moisture resistance, thermal resistance, and mechanical properties required by the cured resin and the laminates prepared therefrom, the usage amount is 30-60 parts by weight, for example, 32 parts by weight, 34 parts by weight, 36 parts by weight, 38 parts by weight, 40 parts by weight, 42 parts by weight, 44 parts by weight, 46 parts by weight, 48 parts by weight, 50 parts by weight, 52 parts by weight, 54 parts by weight, 56 parts by weight or 58 parts by weight.

The component (B) benzoxazine resin in the present invention, can improve the thermal resistance of the cured product and further reduce the water absorption, the usage amount is 5~45 parts by weight, for example, 6 parts by weight, 8 parts by weight, 11 parts by weight, 14 parts by weight, 16 parts by weight, 18 parts by weight, 21 parts by weight, 23 parts by weight, 26 parts by weight, 28 parts by weight, 31 parts by weight, 34 parts by weight, 36 parts by weight, 38 parts by weight, 41 parts by weight, or 43 parts by weight. If the benzoxazine resin is added too little, the improvement of the thermal resistance and the water absorption is not obvious, and if the benzoxazine resin is added too much, the board becomes too brittle to be processed.

The component (B) benzoxazine resin is any one selected from bisphenol-A benzoxazine of formula (I), bisphenol-A benzoxazine of formula (II), bisphenol-F benzoxazine, MDA(4,4'-Methylenedianiline)benzoxazine, phenolphthalein-type benzoxazine, or dicyclopentadiene-type benzoxazin, or a mixture of at least two.

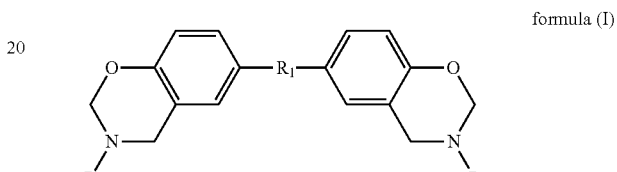

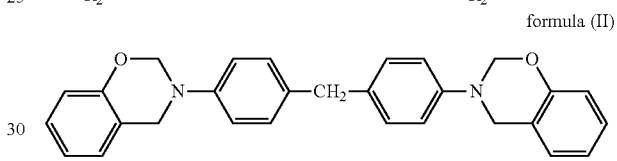

In the formula, $R_1$ is any one selected from

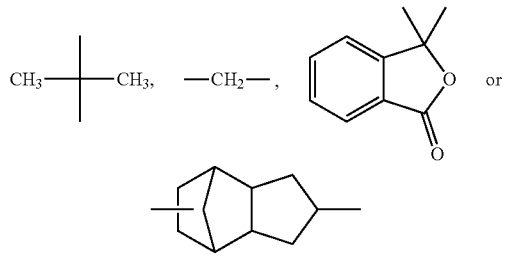

independently, $R_2$ is

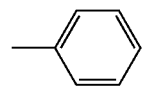

The component (C) alkyl phenol novolac hardener in the present invention, used as the hardener of the component (A) bisphenol-type epoxy resin, the additive amount of the component (C) is 10~30 parts by weight, for example, 12 parts by weight, 14 parts by weight, 16 parts by weight, 18 parts by weight, 20 parts by weight, 22 parts by weight, 24 parts by weight, 26 parts by weight, 28 parts by weight or 30 parts by weight. If an insufficient quantity of the hardener is added, the bisphenol-type epoxy resin cannot be completely cured, and the cured product has low glass transition temperature as well as poor dielectric properties. If an excessive quantity of hardener is added, the cured product has poor flame retardancy.

Preferably, the component (C) alkyl phenol novolac hardener has the following structure:

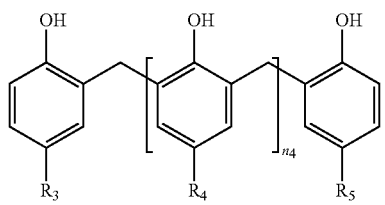

wherein in the formula, $R_3$, $R_4$ and $R_5$ are substituted or unsubstituted straight chain alkyl or branched alkyl with 4~8 (e.g., 5, 6 or 7) carbon atoms independently, and preferably n-butyl or n-octyl, $n_4$ is an integer between 2~20, for example, 3, 4, 5, 6, 7, 8, 9, 10, 11, 12, 13, 14, 15, 16, 17, 18 or 19.

The component (D) in the present invention, i.e., the phosphorus-containing flame retardant makes the resin composition have flame retardant character, and meet the requirement of UL 94V-0. The additive amount of the flame retardant is determined according to the requirement that the flame retardancy of the cured products should reach UL 94V-0 level, without particular restriction. Based on 100 parts by weight of the total additive amounts of component (A), component (B) and component (C), the additive amount of the component (D) phosphorus-containing flame retardant is 5-50 parts by weight, for example, 6 parts by weight, 8 parts by weight, 11 parts by weight, 14 parts by weight, 16 parts by weight, 18 parts by weight, 21 parts by weight, 24 parts by weight, 26 parts by weight, 28 parts by weight, 31 parts by weight, 34 parts by weight, 36 parts by weight, 39 parts by weight, 41 parts by weight, 44 parts by weight, 46 parts by weight or 49 parts by weight, preferably 10-30 parts by weight.

Preferably, the phosphorus-containing flame retardant is any one of tri(2,6-dimethylphenyl)phosphine, 10(2,5-dihydroxyphenyl)-9,10-dihydro-9-oxa-10-phosphaphenanthrene-10-oxide, 2,6-bis(2,6-dimethylphenyl)phosphino benzene, 10-phenyl-9,10-dihydro-9-oxa-10-phosphaphenanthrene-10-oxide, phenoxyphosphazene compound, phosphate, polyphosphate, polyphosphonate or phosphonate-carbonate copolymer, or a mixture of at least two.

Preferably, the halogen-free low dielectric resin composition in the present invention also comprises component (E) curing accelerator, only if it can catalyze the reactions of epoxy functional groups and reduce the reaction temperature of curing system, no specific restriction is made to the curing accelerator and it is preferred to be any one of imidazole compounds, imidazole compounds derivatives, piperidine compounds, Lewis acids and triphenylphosphine, or a mixture of at least two, preferably any one of 2-methylimidazole, 2-ethyl-4-methylimidazole, 2-phenylimidazole and triphenylphosphine, or a mixture of at least two.

The imidazole compounds may be exemplified any one of 2-methylimidazole, 2-ethyl-4-methylimidazole, 2-phenylimidazole and 2-undecylimidazole, or a mixture of at least two. The piperidine compounds may be exemplified any one of 2,3-diaminopiperidine, 2,5-diaminopiperidine, 2,6-diaminopiperidine, 2-amino-3-methyl-piperidine, 2-amino-4-methyl-piperidine, 2-amino-3-nitropiperidine, 2-amino-5-nitropiperidine and 2-amino-4,4-dimethylpiperidine, or a mixture of at least two.

Based on 100 parts by weight of the total additive amounts of component (A), component (B), component (C) and component (D), the additive amount of the component (E) curing accelerator is 0.01~1 parts by weight, for example, 0.05 parts by weight, 0.1 parts by weight, 0.15 parts by weight, 0.2 parts by weight, 0.25 parts by weight, 0.3 parts by weight, 0.35 parts by weight, 0.4 parts by weight, 0.45 parts by weight, 0.5 parts by weight, 0.55 parts by weight, 0.6 parts by weight, 0.65 parts by weight, 0.7 parts by weight, 0.75 parts by weight, 0.8 parts by weight, 0.85 parts by weight, 0.9 parts by weight and 0.95 parts by weight, preferably 0.05-0.8 parts by weight, further preferably 0.05-0.6 parts by weight.

Preferably, the halogen-free low dielectric resin composition in the present invention also comprises component (F) filler, which is primarily used to adjust some physical property effects of the composition, such as to decrease coefficient of thermal expansion (CTE), to decrease water absorption and to enhance thermal conductivity, etc. It is selected from organic or inorganic filler, preferred to be inorganic filler, further preferred to be surface-treated inorganic filler, and most preferred to be surface-treated silica.

Preferably, the surface treating agent for surface treatment is any one selected from silane coupling agent, silicone oligomer or titanate coupling agent, or a mixture of at least two.

Preferably, based on 100 parts by weight of inorganic filler, the additive amount of the surface treating agent is 0.1~5.0 parts by weight, for example, 0.4 parts by weight, 0.8 parts by weight, 1.2 parts by weight, 1.6 parts by weight, 2 parts by weight, 2.4 parts by weight, 2.8 parts by weight, 3.2 parts by weight, 3.6 parts by weight, 4 parts by weight, 4.4 parts by weight, 4.8 parts by weight, preferred to be 0.5~3.0 parts by weight, further preferred to be 0.75~2.0 parts by weight.

Preferably, the inorganic filler is any one selected from non-metallic oxide, metal nitride, non-metallic nitride, inorganic hydrate, inorganic salt, metal hydrate or inorganic phosphorus, or a mixture of at least two, preferred to be one of fused silica, crystalline silica, spherical silica, hollow silica, aluminum hydroxide, aluminum oxide, talcum powder, aluminum nitride, boron nitride, silicon carbide, barium sulfate, barium titanate, strontium titanate, calcium carbonate, calcium silicate, or mica, or a mixture of at least two.

The organic filler is any one selected from polytetrafluoroethylene powder, polyphenylene sulfide or polyether sulfone powder, or a mixture of at least two.

The shape and particle size of the filler have no specific restriction. Preferably, the median particle size of the filler is 0.01~50 μm, for example, 1 μm, 6 μm, 11 μm, 16 μm, 21 μm, 26 μm, 31 μm, 36 μm, 41 μm or 46 μm, preferred to be 0.01~20 μm, further preferred to be 0.1~10 μm. The filler in this particle size range is easier to disperse in the varnish.

In addition, the additive amount of component (F) filler also has no specific restriction. Based on 100 parts by weight of the total additive amounts of component (A), component (B), component (C) and component (D), the additive amount of the component (F) filler is 5~200 parts by weight, for example, 10 parts by weight, 30 parts by weight, 50 parts by weight, 70 parts by weight, 90 parts by weight, 110 parts by weight, 130 parts by weight, 150 parts by weight, 170 parts by weight or 190 parts by weight, preferred to be 5~100 parts by weight, further preferred to be 5~60 parts by weight.

The term "comprise" as described in the present invention intend to mean that it may comprise other components in addition to the said components, and these other components provide different characters for the halogen-free resin composition. Additionally, the term "comprise" of the present invention can also be replaced with close-ended "is" or "consist of . . . ".

For example, the halogen-free thermosetting resin composition may also contain various additives. As specific examples, a curing accelerator, an antioxidant, a thermal stabilizer, an antistat, an ultraviolet absorber, a pigment, a colorant or a lubricant can be listed. These various additives may be used alone, or used in combination with two or more.

The conventional method for preparing the halogen-free resin composition of the present invention is: firstly the solid matter is introduced in, and then the liquid solvent is added. After stirring until the solid matter is completely dissolved, the liquid resin and a optional curing accelerator are added and continuing stirring until homogeneously mixed.

The solvent used in the present invention is not particularly restricted. As specific examples, alcohols such as methanol, ethanol, butanol, etc., ethers such as ethyl cellosolve, butyl cellosolve, ethylene glycol monomethylether, carbitol, butyl carbitol, etc., ketones such as acetone, butanone, methyl ethyl ketone, cyclohexanone, etc., aromatic hydrocarbons such as toluene, xylene, etc., esters such as ethyl acetate, ethoxyethyl acetate, etc., nitrogen-containing solvents such as N,N-Dimethylformamide, N,N-Dimethylacetamide, etc., can be listed. These solvents may be used alone, or used in combination with two or more. It is preferred to be ketones, such as acetone, butanone, methyl ethyl ketone, cyclohexanone, etc. The additive amount of the solvent is determined by the skilled in the art according to their experiences, so that the viscosity of the resin viscosity could be suitable for use.

The second purpose of the present invention is to provide a prepreg, comprising a reinforcing material and the halogen-free resin composition above attached thereon after impregnation and drying.

The reinforcing material has no specific restriction, and it may be organic fiber, inorganic fiber woven or non-woven fabric. The organic fiber may be aramid woven fabric, the inorganic fiber woven may be E-glass fiber fabric, D-glass fiber fabric, S-glass fiber fabric, T glass fiber fabric, NE-glass fiber fabric or quartz fabric. The thickness of the reinforcing material has no specific restriction, and considering the laminates with good dimensional stability, the thickness of the woven or the non-woven fabric is preferred to be 0.01~0.2 mm and it is better to be treated by splitting process and surface-treated by silane coupling agent. In order to provide good water resistance and thermal resistance, the silane coupling agent is preferred to be any one of epoxy-silane coupling agent, amino-silane coupling agent or vinyl-silane coupling agent, or a mixture of at least two. By impregnating the above halogen-free resin composition, the reinforcing material is heated for 1~15 minutes at 100~200° C. to prepare the prepreg.

The third purpose of the present invention is to provide a laminate, and the laminate comprises at least 1 prepreg above. The laminate is prepared by adhering at least more than one prepreg together through heating and pressing.

The laminate is prepared by curing with a hot press. The curing temperature is 150~240° C., the curing pressure is 10~60 Kg/cm$^2$.

The fourth purpose of the present invention is to provide a halogen-free high-frequency circuit base board, the base board comprises at least 1 prepreg above and metal foils covered on one or both sides of the laminated prepregs.

The metal foil may be a copper foil, a nickel foil, an aluminum foil or a SUS foil, etc. The material is not restricted.

Compared to the existing art, the present invention has the following beneficial effects:

①The halogen-free low dielectric resin composition involved in the present invention employs bisphenol-type epoxy resin with specific structure as the main resin. The epoxy resin contains a lot of branched alkyl groups and benzene rings in its molecular structure, and makes the composition have excellent dielectric properties in addition to possessing the advantages of high glass transition temperature, low water absorption and good thermal resistance. ②Being mixed with the benzoxazine resin can improve the thermal resistance of the cured product and further reduce the water absorption; further, the benzoxazine and the phosphorus-containing flame retardant have a synergistic flame retardant effect, can reduce the phosphorus content required for the flame retardancy of the cured products to meet UL94V-0, and further decrease the water absorption; ③the halogen-free low dielectric resin composition of the present invention takes the alkly phenol novolac as the hardener, which can sufficiently exert the advantages of excellent dielectric properties and low water absorption resulted from containing lots of alkyl groups in its structure; ④the prepreg and laminate for printed circuits using the resin composition have the advantages of high glass transition temperature, low dielectric constant, low dielectric dissipation factor, low water absorption, high thermal resistance and good flame retardancy, processability and chemical resistance.

Embodiments

The technical solutions of the present invention are further described below through the specific embodiments.

Aiming at the laminate for printed circuits prepared above (8 prepregs, the type of the reinforcing material is 1080, the thickness is 0.045 mm), the properties like glass transition temperature, dielectric constant, dielectric dissipation factor, water absorption, thermal resistance and flame retardancy and the like are measured. The examples as follows will conduct a further detailed explanation and description.

Aiming at the laminate for printed circuits prepared above, the properties like glass transition temperature, dielectric constant, dielectric dissipation factor, water absorption, thermal resistance and flame retardancy and the like are measured. The examples as follows will conduct a further detailed explanation and description.

Please refer to the preparation examples 1-3, the examples 1-6 and the comparative examples 1-6.

PREPARATION EXAMPLE 1

Bisphenol-Z Epoxy Resin: Preparation of the Epoxy Resin of Formula (a)

A 4-mouth flask (500 ml) equipped with a teflon stirrer, a thermometer, a reflux condenser and a hydrogen chloride gas inlet tube, was added 1.6 mol of phenol, 0.4 mol of cyclohexanone, 100 ml of toluene and 0.08 mol of 2-mercaptoethano; dry hydrogen chloride gas was passed through in a uniform speed of 0.16 mol/h. It was heated in a water bath, the reaction was maintaining for 7 h when the temperature reached to be 30° C., then the stirring and the heating were stopped, the prepared thick slurry was filtered under decompression to produce a pink filter cake. The filter cake was washed for 3-4 times using deionized water of 100° C. to obtain crude product of bisphenol-Z after drying. The crude product was heated and dissolved by anhydrous ethanol in a round bottom flask, the impurities was filtered under decompression while it was still hot, the filtrate was cooled to room temperature, and then it was placed in the refrigerator to recrystallized for 2-3 times to get the white crystals of bisphenol-Z.

The prepared bisphenol-Z was dissolved in 10% NaOH solution, and the epichlorohydrin was added for one time to react at certain temperature. After complete reaction, it was allowed to stand to remove the upper lye, and the organic solvent was added for resin extraction, and then it was washed by water, filtered, removed the solvent to prepare a bisphenol-Z epoxy resin product (Epoxy equivalent: 210 g/eq).

PREPARATION EXAMPLE 2

Bisphenol-AP Epoxy Resin: Preparation of the Epoxy Resin of Formula (b)

A 4-mouth flask (500 ml) equipped with a teflon stirrer, a thermometer, a reflux condenser and a hydrogen chloride gas inlet tube, was added 2 mol of phenol, 0.4 mol of acetophenone, 100 ml of toluene and 0.08 mol of 2-mercaptoethano; dry hydrogen chloride gas was passed through in a uniform speed of 0.16 mol/h. It was heated in a water bath, the reaction was maintaining for 4 h when the temperature reached to be 120° C., then the stirring and the heating were stopped, the prepared thick slurry was filtered under decompression to produce a filter cake. The filter cake was washed for 3-4 times using deionized water of 100° C. to obtain crude product of bisphenol-AP after drying. The crude product was heated and dissolved by anhydrous ethanol in a round bottom flask, the impurities was filtered under decompression while it was still hot, the filtrate was cooled to room temperature, and then it was placed in the refrigerator to recrystallized for 2-3 times to get the white crystals of bisphenol-AP.

The prepared bisphenol-AP was dissolved in 10% NaOH solution, and the epichlorohydrin was added for one time to react at certain temperature. After complete reaction, it was allowed to stand to remove the upper lye, and the organic solvent was added for resin extraction, and then it was washed by water, filtered, removed the solvent to prepare a bisphenol-AP epoxy resin product(Epoxy equivalent: 220 g/eq).

PREPARATION EXAMPLE 3

Bisphenol-TMC Epoxy Resin: Preparation of the Epoxy Resin of Formula (c)

A 4-mouth flask (500 ml) equipped with a teflon stirrer, a thermometer, a reflux condenser and a hydrogen chloride gas inlet tube, was added 1.6 mol of phenol, 0.4 mol of 3,3,5-trimethyl-cyclohexanone, 100 ml of toluene and 0.08 mol of 2-mercaptoethano; dry hydrogen chloride gas was passed through in a uniform speed of 0.16 mol/h. It was heated in a water bath, the reaction was maintaining for 5 h when the temperature reached to be 100° C., then the stirring and the heating were stopped, the prepared thick slurry was filtered under decompression to produce a filter cake. The filter cake was washed for 3-4 times using deionized water of 100° C. to obtain be crude product of bisphenol-TMC after drying. The crude product was heated and dissolved by anhydrous ethanol in a round bottom flask, the impurities was filtered under decompression while it was still hot, the filtrate was cooled to room temperature, and then it was placed in the refrigerator to recrystallized for 2-3 times to get the white crystals of bisphenol-TMC.

The prepared bisphenol-TMC was dissolved in 10% NaOH solution, and the epichlorohydrin was added for one time to react at certain temperature. After complete reaction, it was allowed to stand to remove the upper lye, and the organic solvent was added for resin extraction, and then it was washed by water, filtered, removed the solvent to prepare a bisphenol-TMC epoxy resin product(epoxy equivalent: 240 g/eq).

Now the examples of the present invention are described as follows, but the present invention is not limited to the scope of the examples. Without specific description hereinafter, the "part" thereof represents "part by weight", the "%" thereof represents "wt. %".

(A) epoxy resin (A-1) bispheno-Z epoxy resin

The structure is as formula (a), the epoxy equivalent: 210 g/eq (A-2) bispheno-AP epoxy resin The structure is as formula (b), the epoxy equivalent: 220 g/eq (A-3) bispheno-TMC epoxy resin The structure is as formula (c), the epoxy equivalent: 240 g/eq (A-4) bispheno-A epoxy resin XTW 8093N70 (trade name of HUNTSMAN)

(A-5) bispheno-F epoxy resin

KF8100 (trade name of KOLON, Korea)

(A-6) bispheno-S epoxy resin

EXA-1514 (trade name of Dainippon ink)

(A-7) linear novolac epoxy resin

PNE-177 (trade name of Changchun, Taiwan)

(B) benzoxazine resin (B-1) bispheno-A benzoxazine

LZ 8290H62 (trade name of HUNTSMAN)

(B-2) dicyclopentadiene-benzoxazine

HUN 8260N70 (trade name of HUNTSMAN)

(C) hardener (C-1) alkyl phenol novolac hardener

KPT-F1350E (trade name of KOLON, Korea)

(C-2) linear novolac hardener 2812 (trade name of MOMENTIVE, Korea)

(D) phosphorus-containing flame retardant

DOW XZ92741 (trade name of DOW, America)

(E) 2-phenyl imidazole (trade name of SHIKOKU Chemicals Corporation, Japan)

(F) filler

Spherical silica powder (the average particle size is 1-10 μm, the purity is more than 99%).

TABLE 1 the formulation and physical property data of each example

| | Example | | | | | |
|---|---|---|---|---|---|---|
| | 1 | 2 | 3 | 4 | 5 | 6 |
| A-1 | — | — | — | — | — | 40 |
| A-2 | — | — | — | — | 40 | — |
| A-3 | 30 | 40 | 47 | 60 | — | — |
| A-4 | — | — | — | — | — | — |
| A-5 | — | — | — | — | — | — |
| A-6 | — | — | — | — | — | — |
| A-7 | — | — | — | — | — | — |
| B-1 | 45 | — | 5 | — | 30 | 30 |
| B-2 | — | 30 | — | 5 | — | — |
| C-1 | 10 | 15 | 30 | 15 | 15 | 15 |
| C-2 | — | — | — | — | — | — |
| D | 15 | 15 | 18 | 20 | 15 | 15 |
| E | q.s. | q.s. | q.s. | q.s. | q.s. | q.s. |
| F | 40 | 40 | 40 | 40 | 40 | 40 |
| Glass transition temperature (DSC) ° C. | 177 | 174 | 168 | 170 | 167 | 165 |
| Dielectric constant (1 GHz) | 3.65 | 3.63 | 3.61 | 3.59 | 3.68 | 3.69 |
| Dielectric dissipation (1 GHz) | 0.0088 | 0.0085 | 0.0075 | 0.0079 | 0.0087 | 0.0082 |
| Water absorption (%) | 0.06 | 0.06 | 0.07 | 0.08 | 0.07 | 0.07 |
| Solder dip 288° C., s | >120 | >120 | >120 | >120 | >120 | >120 |
| Flame retardancy | V-0 | V-0 | V-0 | V-0 | V-0 | V-0 |

TABLE 2 the formulation and physical property data of each comparative example

| | Comparative Example 1 | | | | | |
|---|---|---|---|---|---|---|
| | 1 | 2 | 3 | 4 | 5 | 6 |
| A-1 | — | — | — | — | — | — |
| A-2 | — | — | — | — | — | — |
| A-3 | — | — | — | — | 40 | — |
| A-4 | 40 | — | — | — | — | 40 |
| A-5 | — | 40 | — | — | — | — |
| A-6 | — | — | 40 | — | | |
| A-7 | — | — | — | 40 | | |
| B-1 | 30 | 30 | 30 | 30 | 30 | 30 |
| B-2 | — | — | — | — | — | — |
| C-1 | 15 | 15 | 15 | 15 | — | — |
| C-2 | — | — | — | — | 15 | 15 |
| D | 15 | 15 | 15 | 15 | 15 | 15 |
| E | q.s. | q.s. | q.s. | q.s. | q.s. | q.s. |
| F | 40 | 40 | 40 | 40 | 40 | 40 |
| Glass transition temperature (DSC) ° C. | 148 | 150 | 169 | 177 | 167 | 146 |
| Dielectric constant(1 GHz) | 4.01 | 4.05 | 3.98 | 4.05 | 3.96 | 4.08 |
| Dielectric dissipation(1 GHz) | 0.0105 | 0.0118 | 0.0097 | 0.0121 | 0.0110 | 0.0125 |
| Water absorption(%) | 0.14 | 0.14 | 0.13 | 0.09 | 0.08 | 0.13 |
| Solder dip 288° C., s | 65 | 90 | >120 | >120 | >120 | 82 |
| Flame retardancy | V-0 | V-0 | V-0 | V-0 | V-0 | V-0 |

The test methods of the characters above are as follows:
(a) Glass transition temperature (Tg): measured according to the differential scanning calorimetry (DSC) as the method stipulated under IPC-TM-650 2.4.25.
(b) Dielectric constant, the dielectric dissipation factor: the dielectric constant, the dielectric dissipation factor at 1 GHZ measured according to the resonance method using a strip line, in accordance with the method stipulated under IPC-TM-650 2.5.5.5.
(c) Water absorption: measured according to the method of IPC-TM-650 2.6.2.1.
(d) Solder dip: time for delamination and blister is observed according to IPC-TM-650 2.4.13.1.
(e) Flame retardancy: measured according to UL94 vertical firing method.

It can be known from the physical property data in table 2, in the comparative example 1 it is cured using bispheno-A epoxy resin, benzoxazine resin and alkyl phenol novolac hardener, in the comparative example 2 it is cured using bispheno-F epoxy resin, benzoxazine resin and alkyl phenol novolac hardener, the prepared laminate has low glass transition temperature, high water absorption, poor dielectric properties and thermal resistance; in the comparative example 3 it is cured using bispheno-S epoxy resin, benzoxazine resin and alkyl phenol novolac hardener, in the comparative example 4 it is cured using linear novolac epoxy resin, benzoxazine resin and alkyl phenol novolac hardener, the prepared laminate has high glass transition temperature, good thermal resistance but poor dielectric properties; in the comparative example 5 when using bispheno-TMC epoxy resin, benzoxazine resin and linear novolac hardener to be cured, the prepared laminate has poor dielectric properties, and it is hard to satisfy the requirement for dielectric properties of laminate in thermosetting high-speed art; in the comparative example 6 when using bispheno-A epoxy resin, benzoxazine resin and linear novolac hardener to be cured, the prepared laminate has low glass transition temperature, high water absorption, poor dielectric properties and poor thermal retardancy; the examples 1-6 in table 1 use new bispheno-type epoxy resin which has specific structures of the present invention, benzoxazine resin and alkyl phenol novolac hardener, after co-curing, the prepared laminate has high glass transition temperature, excellent dielectric properties, low water absorption and high thermal retardancy, and achieves halogen-free and flame retardancy, and meet the requirement of UL94 V-0 level.

As described above, compared to conventional halogen-free laminates, the laminate for printed circuits of the present invention has more excellent dielectric properties, moisture resistance, and thermal resistance, being suitable to be used in the field of high density interconnect art. Additionally, the present invention sufficiently exerts the synergistic character of the benzoxazine resin and phosphorus-containing flame retardant. The halogen content can reach V-0 standard in the flame retardant test UL94 within the scope of JPCA halogen-free standard requirements, having the efficacy of environmental protection.

The applicant states that the present invention illustrates the detailed composition of the present invention through the examples above, but is not limited to the detailed composition above, i.e., it does not mean the present invention must be embodied dependently on the detailed composition above. Those skilled belonging to the technical field should understand, any improvement to the present invention, equivalent replacement for each material of the product of the present invention, addition of auxiliary components and selection of specific products all fall into the protection scope and disclosure scope of the present invention.

The invention claimed is:

1. A halogen-free resin composition, based on 100 parts by weight of the organic solid matter, comprising:

(A) bisphenol-type epoxy resin: 30~60 parts by weight, wherein the bisphenol-type epoxy resin comprises at least two epoxy resins of formula (a), formula (b) or formula (c):

formula (a)

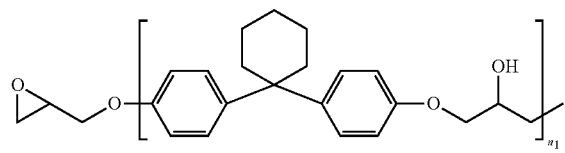

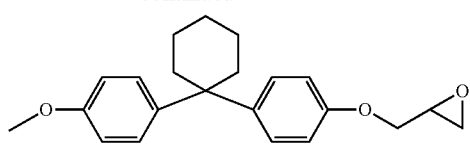

formula (b)

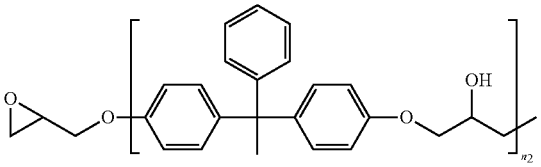

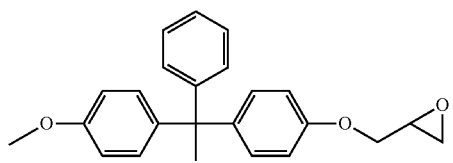

formula (c)

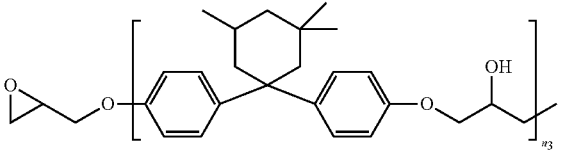

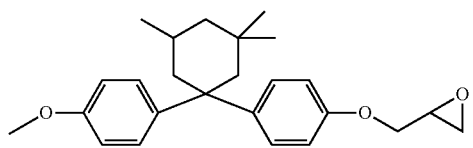

wherein, $n_1$, $n_2$ and $n_3$ are any independent integer between 2-20;

(B) benzoxazine resin: 5~45 parts by weight;

(C) alkyl phenol novolac hardener: 10~30 parts by weight;

(D) phosphorus-containing flame retardant, wherein the benzoxazine resin (B) is any one selected from bisphenol-A benzoxazine of formula (I), bisphenol-A benzoxazine of formula (II), bisphenol-F benzoxazine, 4,4'-methylenedianiline benzoxazine, phenolphthalein-type benzoxazine or dicyclopentadiene-benzoxazine, or a mixture of at least two;

formula (I)

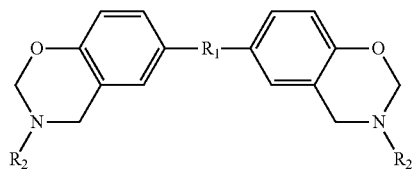

formula (II)

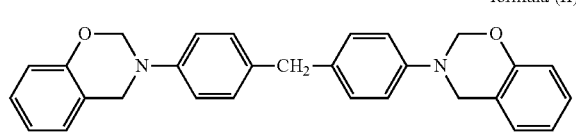

wherein $R_1$ of formula (I) is any one selected from

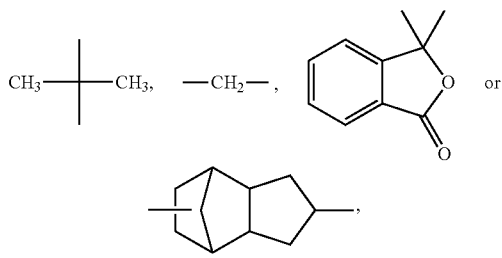

and $R_2$ is independently

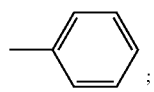

wherein the alkyl phenol novolac hardener (C) has the following structure:

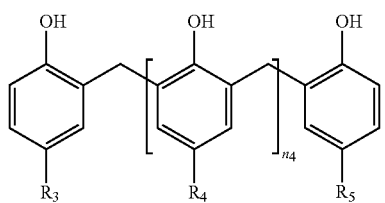

wherein $R_3$, $R_4$ and $R_5$ are substituted or unsubstituted straight chain alkyl or branched alkyl with 4~8 carbon atoms independently and $n_4$ is an integer between 2~20.

2. The halogen-free resin composition according to claim 1, wherein, based on 100 parts by weight of the total additive amounts of component (A), component (B), and component (C), the additive amount of the phosphorus-containing flame retardant (D) is 5-50 parts by weight.

3. The halogen-free resin composition according to claim 1, wherein the phosphorus-containing flame retardant is any one of tri(2,6-dimethylphenyl)phosphine, 10-(2,5dihydroxyphenyl)-9,10-dihydro-9-oxa-10-phosphaphenanthrene-10-oxide, 2,6-bis(2,6-dimethylphenyl)phosphino benzene, 10-phenyl-9,10-dihydro-9-oxa-10-phosphaphenanthrene-10-oxide, phenoxyphosphazene compound, phosphate, polyphosphate, polyphosphonate or phosphonate-carbonate copolymer, or a mixture of at least two of the foregoing.

4. The halogen-free resin composition according to claim 1, wherein the halogen-free resin composition further comprises a curing accelerator (E).

5. The halogen-free resin composition according to claim 4, wherein the curing accelerator (E) comprises any one of imidazole compounds, imidazole compounds derivatives, piperidine compounds, Lewis acids and triphenylphosphine, or a mixture of at least two of the foregoing.

6. The halogen-free resin composition according to claim 5, wherein the curing accelerator comprises any one of 2-methylimidazole, 2-ethyl-4-methylimidazole, 2-phenylimidazole, triphenylphosphine, 2-undecylimidazole, 2,3-diaminopiperidine, 2,5-diaminopiperidine, 2,6-diaminopiperidine, 2-amino-3-methyl-piperidine, 2-amino-4-methyl piperidine, 2-amino-3-nitropiperidine, 2-amino-5-nitropiperidine and 2-amino-4,4-dimethyl piperidine, or a mixture of at least two of the foregoing.

7. The halogen-free resin composition according to claim 4, wherein, based on 100 parts by weight of the total additive amounts of component (A), component (B), component (C), and component (D), the additive amount of the curing accelerator (E) is 0.01~1 parts by weight.

8. The halogen-free resin composition according to claim 1, wherein the halogen-free resin composition further comprises a filler (F).

9. The halogen-free resin composition according to claim 8, wherein the filler (F) is surface-treated inorganic filler.

10. The halogen-free resin composition according to claim 9, wherein the surface-treated inorganic filler comprises surface-treated silica, and the surface treating agent for surface treatment is any one selected from silane coupling agent, silicone oligomer or titanate coupling agent, or a mixture of at least two of the foregoing.

11. The halogen-free resin composition according to claim 9, wherein, based on 100 parts by weight of the surface-treated inorganic filler, the additive amount of the surface treating agent is 0.1~5.0 parts by weight.

12. The halogen-free resin composition according to claim 8, wherein the median particle size of the filler is 0.01~50 μm.

13. The halogen-free resin composition according to claim 8, wherein, based on 100 parts by weight of the total additive amounts of component (A), component (B), component (C), and component (D), the additive amount of the filler (F) is 5~200 parts by weight.

14. A prepreg, comprising a reinforcing material and the halogen-free resin composition according to claim 1 attached thereon after impregnation and drying.

15. A laminate, comprising at least one prepreg according to claim 14.

* * * * *